Figure 1:
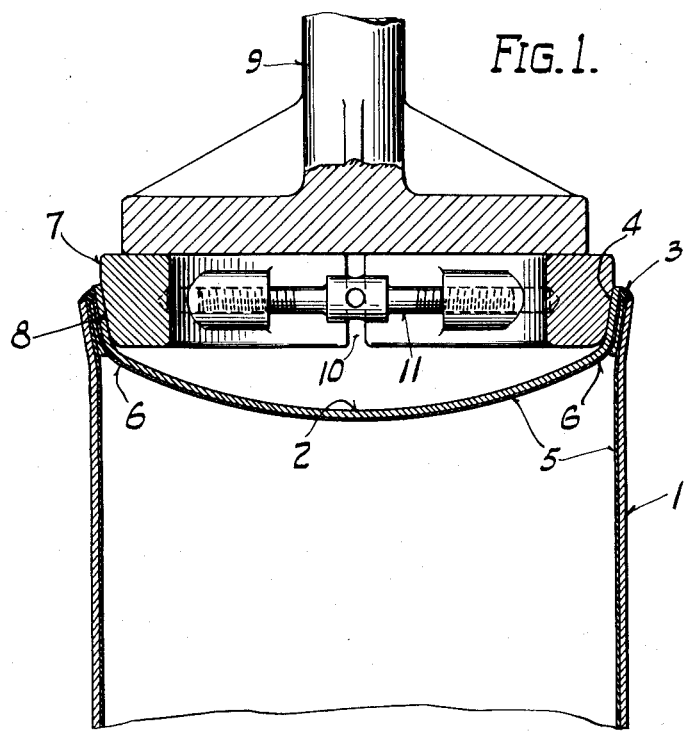

Wesley G. Martin
INVENTOR.

BY *[signature]*
ATTORNEY.

Patented May 7, 1946

2,399,815

UNITED STATES PATENT OFFICE 2,399,815

METHOD OF WELDING

Wesley G. Martin, Milwaukee, Wis., assignor to A. O. Smith Corporation, Milwaukee, Wis., a corporation of New York Application December 26, 1942, Serial No. 470,310

5 Claims. (Cl. 113—112)

This invention relates to a method of welding and has been applied to the welding of heads in enamel-lined hot water tanks.

During the assembly of a glass or enamel-lined hot water tank, stresses are often produced in the heads and shell of the tank. These stresses are accumulative to a point where combined stresses due to welding and pressure exerted in tests or in service may cause the enamel or glass lining to craze, particularly in the knuckle area of the head.

The principal object of the invention is to greatly reduce the stresses in the members resulting from the contraction of the weld during cooling.

Another object of the present invention is to assemble and weld a head in the end of the shell of a ceramic or otherwise enamel-lined hot water tank by a method under which the stresses introduced during welding are controlled.

Another object is to provide a method of welding a lined head in the end of the shell of a hot water tank in which the development of welding stresses in the knuckle area of the head is prevented to reduce the danger of injury to the lining in this area when the tank is in service.

A further object is to provide a method of welding a hot water tank that enables the employment of lighter weight heads.

These and other objects will be apparent from the following description and accompanying drawing.

Figure 2:
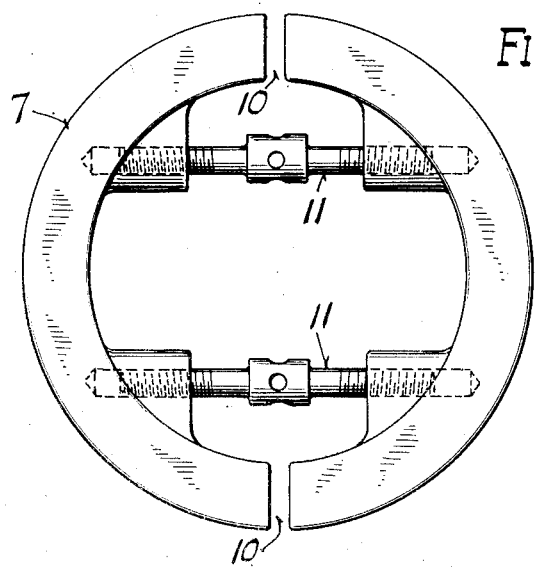

In the drawing:

Figure 1 is a longitudinal sectional view of a shell and head of a hot water heater shown with an apparatus that may be employed in carrying out the method of the invention; and Fig. 2 is a top plan view of the mandrel employed.

Referring to the drawing, there is shown a portion of a generally cylindrical shell 1 of a hot water storage tank in one end of which is secured the inverted or flanged head 2 by the circumferentially disposed weld 3. The weld 3 joins flange 4 of the head to the shell. The interior surfaces of head 2 and shell 1 are covered with the ceramic or vitreous enamel lining 5 which is bonded thereto to protect the same from corrosion in service. The lining is provided by spraying enamel frit on the inside surfaces of the head and shell members and then fusing the frit thereto at a high firing temperature.

Under ordinary welding conditions when weld 3 is made, the knuckle area of head 2 as shown at 6 is subjected to substantial stresses due to shrinkage of the upper edge of flange 4 of the head when weld 3 cools to room temperature. These stresses weaken knuckle area 6 and when additional stresses are developed in this area, as under test pressures or in service, the elastic limit of the metal may be reached and a movement of the head may be caused that will injure or craze the enamel lining 5.

In carrying out the invention, the weld is prevented from contracting in circumference while cooling so that its contraction occurs in other directions and the component of contraction tending to stress the knuckle area of the head is greatly reduced or entirely eliminated. This is accomplished by applying a mandrel tending to expand the head flange and weld while the latter is cooling.

The drawing illustrates one manner in which the method of the invention may be carried out. The apparatus there shown comprises a split mandrel 7 having a cone-shaped or tapered surface 8 at the lower end to engage the complementary tapered flange 4 of head 2 and a generally flat top surface to be engaged by a hydraulic ram 9. The mandrel is designed to become substantially circular when expanded and to withstand the pressure exerted by hydraulic ram 9 in operation.

Mandrel 7 is split through its longitudinal axis as at 10 to permit expansion and contraction in circumference by operation of a device such as the screw arrangement 11 disposed inside the mandrel. The change of the circumference of mandrel 7 primarily facilitates removal of the mandrel from head 2.

In actual operation, mandrel 7 may be utilized in several ways. It may, for example, be first expanded to its maximum circumference by the screw jack arrangement 11 and then forced into head 2 under axial pressure from hydraulic ram 9 to expand the head flange prior to welding or to the cooling of the weld, or the mandrel may be first inserted into the head when at minimum circumference and then expanded before or immediately after weld 3 is started. It is preferable that expansion of the mandrel occur before any portion of weld 3 starts to cool.

Assume for the purpose of illustration that mandrel 7 is first expanded to maximum circumference and then forced into head 2 under axial pressure from ram 9 and maintained therein by such pressure. The conical tapered shape of the inner end of the mandrel expedites insertion in this manner and provides a wedge-like action serving to expand the flange 4 and shell end outwardly.

Head 2 is next welded in the end of shell 1 by weld 3 which joins flange 4 to the shell. The shrinkage of weld 3 would ordinarily bend the end of flange 4 of the head inwardly but by employment of the mandrel such inward movement of flange 4 is substantially prevented by the radial component of force exerted by the mandrel 7. The metal of weld 3 is compelled under these conditions to stretch, or rather, to contract in other directions than circumferentially. The weld metal remains in a substantially permanently stretched state after it has cooled to room temperature. When mandrel 7 is removed after room temperature is reached, any slight inward movement of flange 4 or shrinkage of head 2 would be insufficient to create any substantial stress in knuckle area 6.

During the welding operation and the time weld 3 is cooling, mandrel 7 is securely held within head 2 under the end pressure exerted by ram 9. After the weld is sufficiently cooled to eliminate any substantial shrinkage of the head, the screw arrangement 11 is operated to decrease the circumference of mandrel 7. The mandrel may then easily be removed from head 2.

By preventing welding stresses from building up in knuckle area 6 in this manner, there is little danger of injury to lining 5 of head 2 at the knuckle area when the tank is later subjected to test pressures or to the usual pressures in service.

It is important to keep mandrel 7 under sufficient axial pressure from ram 9 to maintain the mandrel in head 2 against the radial shrinkage pressure exerted by weld 3 in cooling to room temperature. It has been found that if cooling means are provided for mandrel 7 or if weld 3 itself is cooled, the length of time mandrel 7 need be retained in the head may be substantially reduced and the axial pressure required to be applied to the mandrel may be decreased.

Weld 3 cools considerably more rapidly when head 2 is contacted, for example, by a cooled mandrel. This lessens the time mandrel 7 need remain in head 2 for the weld to cool to room temperature. The axial pressure necessary to be exerted on the mandrel by ram 9 when a cooled mandrel is employed may also be decreased, as the overlapping portions of the head and shell need not be radially expanded to the extent required in the case of a non-cooled mandrel.

The invention prevents stresses from building up in and weakening the knuckle area of the head of the tank. Danger of injury to the lining under test pressures or normal pressures in service is lessened. The invention also enables the employment of lighter weight metal in the heads to reduce costs of production.

Various embodiments of the invention may be employed within the scope of the accompanying claims.

I claim:

1. In the welding of members together wherein at least one of the members has a hard coating bonded thereto and subject to fracture by flexure of the member and a portion of said coated member adjacent the weld is subject to stress tending to injure the coating from elastic movement of the member caused by the contraction of the weld, the steps comprising supporting the weld against movement during cooling in a direction to reduce the component of weld contraction tending to stress said member, and thereafter removing the support from said weld.

2. In the welding of members together wherein at least one of the members has a ceramic enamel coating bonded thereto and a portion of said coated member adjacent the weld is subject to stress tending to injure the coating from elastic movement of the member caused by the contraction of the weld, the steps comprising stretching the uncooled weld in a direction opposite to its contraction and supporting the same against contraction while cooling to substantially reduce the movement of said member under the influence of contraction of the weld.

3. In the welding of members together wherein at least one of the members has a ceramic enamel coating bonded thereto and a portion of said coated member adjacent the weld is subject to stress tending to injure the coating from elastic movement of the member caused by the contraction of the weld, the steps comprising elastically stressing the coated member adjacent the weld area in a direction opposite to that resulting from contraction of the weld, welding the members together and cooling the weld while said coated member is so stressed, and thereafter relieving the stress from said member.

4. In the welding of a ceramic enamel lined flanged head to the cylindrical body of a tank wherein the flange of the head extends outwardly, elastically expanding the flange of the head and supporting the same in expanded position during cooling of the weld to compensate for contraction of the weld and prevent stressing of the knuckle region of the head thereby and consequent injury to the enamel.

5. In the fabrication of ceramic enamel-lined tanks having an inverted flanged head set into the end of a cylindrical body, the steps of assembling the head with the body, applying a mandrel having an outer surface complementary to and engaging the inside of the head flange and pressing the flange radially outwardly to elastically stretch the same, then circumferentially welding the end of the body to the head flange, and removing said mandrel after cooling of the weld, said mandrel serving to prevent circumferential shrinkage of the weld during cooling and thereby protect the enamel in the knuckle region of the head from fracture by stress concentrations in the head during service of the tank.

WESLEY G. MARTIN.